Patented Feb. 16, 1954

2,669,573

UNITED STATES PATENT OFFICE 2,669,573

BODYING CATALYSTS FOR DRYING OILS

Earl E. Parker, Milwaukee, Wis., assignor to Pittsburgh Plate Glass Company, Allegheny County, Pa., a corporation of Pennsylvania No Drawing. Application June 11, 1948,
Serial No. 32,549

8 Claims. (Cl. 260—407)

The present invention relates to the treatment of glyceride oils of the drying or semi-drying type and it has particular relation to the heat treatment of such oils for purposes of increasing the viscosity and improving the drying characteristics thereof.

One object of the invention is to provide a process of bodying in which the reactions involved in the bodying of the oil are substantially accelerated.

A second object of the invention is to provide an accelerator of bodying of drying oils which is soluble in the oils when cold or which can be cooked into a master batch of high concentration and added to the cold oil without the catalyst becoming insoluble or settling out.

A third object of the invention is to provide a catalyst of bodying which when incorporated in the oil prior to bodying will remain effective over long periods of time even though the oil is stored at room temperature in contact with air during the period of storage.

A fourth object of the invention is to provide a catalyst of bodying which is non-volatile at room temperature.

A fifth object of the invention is to provide a catalyst of bodying which does not volatilize to a substantial degree during the bodying operations even when such operations are conducted at atmospheric pressure.

A sixth object of the invention is to provide a catalyst of bodying which is not subject to flashing at the temperature of bodying.

A seventh object of the invention is to provide a catalyst of bodying which does not decompose to yield solid products in the finished oil and which does not effect the acid number or color or drying properties of the oil.

An eighth object of the invention is to provide a catalyst of bodying which is effective even when employed in relatively small concentrations in the oil.

These and other objects of the invention will be apparent from consideration of the following specification and the appended claims.

A common method of treating glyceride oils and notably oils of the drying or semi-drying type such as are employed as vehicles in paints, varnishes and similar coating compositions involves subjecting the oil to a so called bodying operation. In this operation the oil is commonly heated in a kettle, preferably with exclusion of air, to a temperature of 500 or 600° F. to effect increase of viscosity by polymerization and to effect decolorization, as well as other changes in oil. Usually, the length of time and the temperature of heating are so regulated as to obtain a viscosity adapting the oil for particular application. Commonly, the desired degree of viscosity is determined by simple viscosity tests such as the so called Gardner-Holdt test which involves observance of the rate of movement of a bubble of air in a small standardized tube of the oil to be tested. Commonly, the bodying operation is stopped before the oil becomes a gel and usually the Gardner-Holdt reading will range above B or C and may extend as high as Z-6 or possibly even higher. The bodying operation requires rather high temperatures, e. g. about 550 or 600° F. in most operations, but preferably it is below the flash point of the oil especially if open kettle bodying is to be practiced. Higher temperatures up to 625°, or even higher may be employed in a closed system and under pressure or reduced pressure.

One objectionable feature of the bodying operation as heretofore practiced, has resided in the fact that the changes in viscosity were relatively slow and required many hours to attain completion, especially in the more highly bodied oils. In order to speed up the bodying, it has been proposed to add catalytic substances such as finely divided metals, sulphur, sulphur dioxide, boron compounds and the like. Organic substances have also been suggested. However no completely satisfactory material has heretofore been suggested. Some of them were not satisfactory because the acceleration of the rate of bodying was too low or because uneconomical percentages of the catalyst were required. Still others were objectionable because they resulted in discoloration or other objectionable changes in the oil, or because they were too insoluble in the oil or because they were of a volatile nature. Some of them were also objectionable because they were adversely effected by the atmosphere during periods of storage.

According to the present invention it has been discovered that 9 anthrones, that is compounds containing an oxygen group attached to one of the carbons of the middle ring of anthracene constitute highly satisfactory catalysts of the bodying of drying and semi-drying oils.

Compounds of the type contemplated herein embody the following structure:

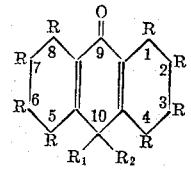

In this formula, the groups $R_1$ and $R_2$ may be hydroxy, hydrogen, hydrocarbon or a duplication of a radical similar to the molecule designated by the formula. R may be hydrogen, hydroxy, chloro, carboxy, or a hydrocarbon group. Two hydrocarbon groups R may also be joined to form a ring. For example, in the formula the groups in positions 1 and 2 may be shared as a single nucleus, e. g. a benzenoid ring, as in 1,2-benz-9-anthrone. Some catalysts included by the formulae are more efficient than others and some are too expensive at the present time for general use but all are at least in some degree operative under the provisions of the invention. The preparation of these catalysts is well known in organic chemistry and discussion of the details thereof is not deemed to be necessary.

Oils which may be treated in accordance with the provisions of the invention include raw or refined linseed oil or soybean oil or other drying or semi-drying oil. The catalysts are employed in the oil in a ratio within a range of about 0.05 to 2 or 3% by weight based upon the oil to be treated. Preferably, for reasons of economy, the proportion is not above 1%. The temperature of treatment preferably will be bodying temperature for the oil such as may be employed in the absence of catalysts. Usually, the temperature will be above 500° F. and preferably is around 575° or above or any other temperature, for example, up to 625 or 650° F. These later temperatures are above the flash point and require inclosure of the oil in a closed container to prevent flash. Preferably, the reaction is conducted in the absence of, or as complete absence as practicable, of air or oxygen. The oil may be blanketed with an inert gas, e. g. $CO_2$ or it may be enclosed in coils or in containers which exclude contact with the air. Continuous bodying in kettles or the coils is contemplated but the process is most commonly employed as a batch operation.

The catalyst may be dissolved in the oil while it is cold or it may be added after the oil is heated to bodying temperature. It is also permissible to incorporate a large percentage of catalyst into a master batch, portions of which are added to the oil to be bodied to obtain the desired concentration in the main batch.

The period of heating required to obtain desired body depends, of course, upon the body to be attained, which as above stated, may cover a very wide range, dependent upon the manner of application and the properties desired. It will also depend upon the oil treated. For example, oils possessing a high capacity for drying, such as linseed oil require much less time than slower drying oil such as ordinary soybean oil. The most convenient method of determining completion of the bodying operation for a given oil involves the conventional tests such as the Gardner-Holdt test previously referred to, but any other viscosity test for determination of the changes constituting criteria of bodying may also be employed to determine the completion of the operation. Usually the bodying operation will be completed within a period of 1 to 6 or 7 hours, dependent upon the type of oil body selected, the temperature of bodying and the amount of catalyst, as well as the specific catalyst selected for the operation.

The following tests illustrate specific examples of the bodying of certain oils with a number of different catalysts. The temperature of operation was selected arbitrarily as 575° F. The oil was maintained under a blanket of carbon dioxide during the heat up period but the gas was turned off after bodying temperature of 575° F.

was obtained. The catalyst was added at the conclusion of the warm-up period but might have been added earlier if so desired. The oil in each instance was bodied to a viscosity of $Z_2$, as determined by the Gardner-Holdt scale. This value was selected arbitrarily since a lower or higher body could have been selected if so desired. The critical data for a series of tests involving various anthrone catalysts and employing linseed or soybean oil are tabulated below:

| Oil | Catalyst | Percent Catalyst | Time in Minutes |
|---|---|---|---|
| Linseed | Benzanthrone | 1.0 | 115 |
| Do | 9 anthrone | 1.0 | 110 |
| Do | 2-carboxy-anthrone | 0.3 | 145 |
| Do | 1,4 dihydroxy anthrone | 0.5 | 200 |
| Do | Benzyl-bromobenzanthrone | 1.0 | 120 |
| Do | Beta-methyl anthrone | 0.5 | 130 |
| Do | Dianthrone | 0.5 | 125 |
| Do | 1,2-benz-9-anthrone | 0.5 | 105 |
| Do | 1,2-benz-10-anthrone | 0.5 | 105 |
| Do | 10-benzal-9-anthrone | 0.5 | 145 |
| Do | 10,10-dibenzyl-9-anthrone | 0.5 | 175 |
| Do | 10-benzyl-10-hydroxy-9-anthrone | 0.2 | 145 |
| Do | None | | 210 |
| Soy bean | do | | 370 |
| Do | 9-anthrone | 0.5 | 190 |
| Do | do | 0.2 | 240 |

The oil when bodied by the foregoing process or processes is completely satisfactory as to color. It does not undergo adverse change of acid value or iodine value or other objectionable changes. The oil can be mixed with diluents or extenders such as naphtha or turpentine. It can also be incorporated with gums and resins such as conventional alkyd resins or ester gums. Likewise coloring matter and pigments such as lead oxide or litharge, titanium dioxide and many other similar materials may be incorporated in amounts for example within a range 5 to 60 parts to provide coating compositions which are highly suitable for the conventional applications.

It will also be apparent that catalysts such as naphthenates, oleates or other salts of cobalt, lead, nickel or manganese or the like, which are employed as siccatives in drying oils may be incorporated with the bodied oils in order to promote drying when the oils are spread as films upon any surface to be coated. Films of the bodied oils dry to hard, tough, water resistant films.

The treatment of triglyceride oils of the drying or semi-drying type has been described with particularity. These are the most common types. However, the substitution in the examples of other drying oils such as synthetic drying oils obtained by formation of neutral esters of such higher alcohols as pentaerythritol and drying oil fatty acids is contemplated. The fatty acids might be those of linseed oil, soybean oil or other fatty acids, a reasonable proportion of which contains two or more double bonds in the hydrocarbon nucleus to provide a drying oil.

The forms of the invention described are to be regarded as being by way of example only. It will be apparent to those skilled in the art that numerous modification may be made therein without departure from the spirit of the invention or scope of the appended claims.

I claim:

1. A process of treating a drying glyceride oil which comprises heating the oil to bodying temperature in the presence of .05 to 3% of a catalyst consisting essentially of 9-anthrone until a desired increase of viscosity is attained.

2. The process of accelerating the heat bodying of a drying glyceride oil which comprises incorporating in the oil prior to the heating operation .05 to 3% of a catalyst consisting essentially of 9-anthrone.

3. Glyceride drying oil adapted quickly to be bodied by application of a bodying temperature, said oil containing .05 to 3% of a catalyst consisting essentially of a 9-anthrone.

4. Glyceride oil as defined in claim 3 in which the anthrone is 9-benzanthrone.

5. A process of bodying a drying oil which process comprises heating the oil containing 0.05 to 2% of a catalyst consisting essentially of a 9-anthrone to a temperature of 500 to 625° F. until the desired increase of viscosity is attained.

6. A process of bodying a drying oil which comprises a neutral ester of a drying oil acid and an alcohol containing at least 3 hydroxyl groups, which process comprises heating the oil to a temperature of about 500 to 625° F. in the presence of 0.05 to 2% of a catalyst consisting essentially of a member of the class consisting of 9-anthrone, a 1,2-benz-9-anthrone, 1,2-benz-10-anthrone, 10-benzal-9-anthrone, 10-10-dibenzyl-9-anthrone, 10 benzyl 10 hydroxy 9-anthrone.

7. The process of accelerating the heat bodying of a drying glyceride oil which comprises incorporating in the oil prior to the heating operation about 2% of a catalyst consisting essentially of 9-anthrone.

8. A process for preparing a heat-bodied drying glyceride oil which comprises heating the oil in the presence of about 2% of a catalyst consisting essentially of 2-methyl anthrone.

EARL E. PARKER.

References Cited in the file of this patent

UNITED STATES PATENTS

| Number | Name | Date |
|---|---|---|
| 2,207,686 | Schwarcman | July 9, 1940 |
| 2,213,935 | Sorensen et al. | Sept. 3, 1940 |
| 2,230,470 | Schwarcman | Feb. 4, 1941 |

OTHER REFERENCES

"The Chemistry of the Organic Compounds" by Victor von Richter, vol. III, pages 656–657, 1946 ed. Elsevier Publishing Co., Inc., New York, N. Y., publishers.